W. A. BUETTNER & A. SHELBURNE.
CUTTER CHAIN FOR MINING MACHINES.
APPLICATION FILED JAN. 31, 1910.

1,023,549.

Patented Apr. 16, 1912.

Witnesses
Walter Troemel.
Thomas W. McMeans

Inventors
William A. Buettner, and
Arthur Shelburne.
By Bradford Hood
Attorneys.

UNITED STATES PATENT OFFICE.

WILLIAM A. BUETTNER AND ARTHUR SHELBURNE, OF TERRE HAUTE, INDIANA.

CUTTER-CHAIN FOR MINING-MACHINES.

1,023,549.  Specification of Letters Patent.  Patented Apr. 16, 1912.

Application filed January 31, 1910. Serial No. 541,045.

*To all whom it may concern:*

Be it known that we, WILLIAM A. BUETTNER and ARTHUR SHELBURNE, citizens of the United States, residing at Terre Haute, in the county of Vigo and State of Indiana, have invented a certain new and useful Cutter-Chain for Mining-Machines, of which the following is a specification.

In a chain cutter mining machine the cutting bits are carried upon an endless chain supported at the cutting point between a pair of idlers, the links of the chain having extending flanges which coöperate with guideways on the supporting structure. The chains commonly in use are composed of bit-carrying blocks which are connected by links each of which is provided at each end with an integral lug journaled within a cross opening formed through the bit-carrying block. The integral lugs of the connecting links are subjected to very considerable pressures and they cannot be too large because, if they are, the chains will be so strong as to be capable of standing stresses largely in excess of stresses which other portions of the machine are capable of standing and care is taken, in the design of such a chain, to make it sufficiently weak to break, by shearing off of the lugs of the connecting links, before the gearing and other portions of the machine can be injured. In such a chain it is found that the forward lugs of each link are worn upon their rear faces much more than the rear lugs are worn and this is due to the fact that the chain is being pulled through the coal.

The object of our present invention is to produce a bit-carrying chain capable of use in standard mining machines, and therefore exchangeable for chains now commonly in use, of a form so modified as to be capable of withstanding the objectionable wear above mentioned without, however, increasing the ultimate strength of the chain so that such chain may be used in standard and existing mining machines without liability of causing injury to such machines.

The accompanying drawings illustrate our invention.

Figure 1:
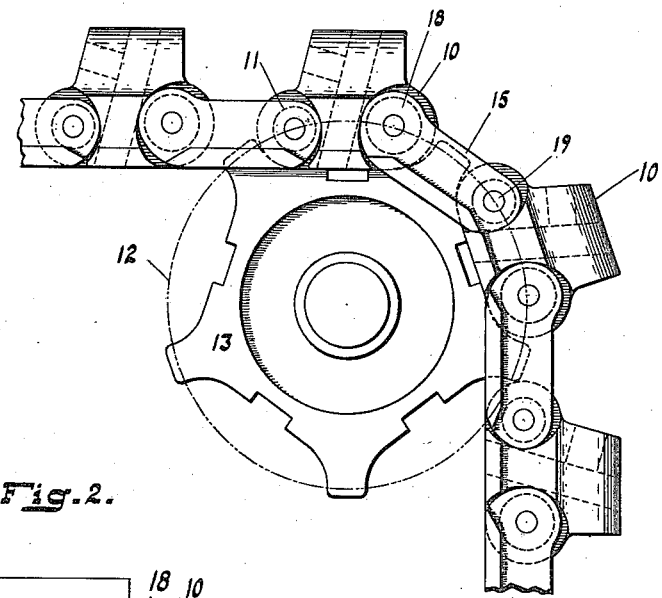
Figure 2:
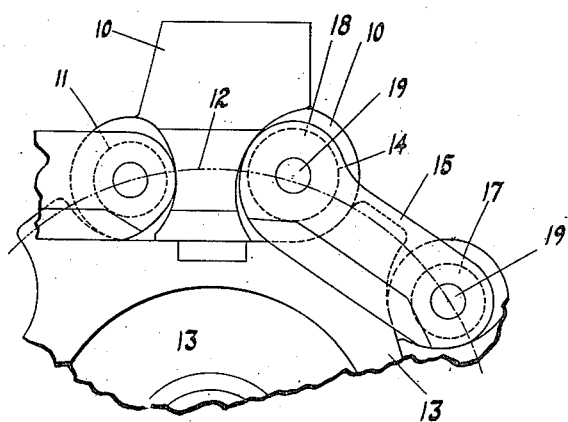
Figure 4:
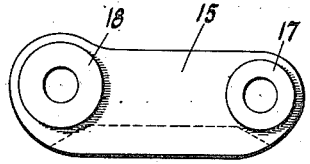
Figure 3:
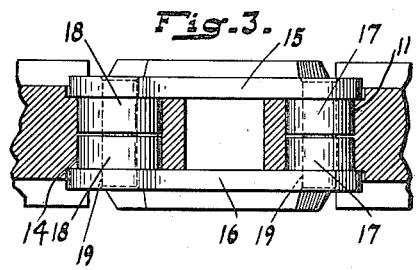

Figure 1 is an elevation of a short section of our improved chain in position over an idler; Fig. 2 an enlarged elevation of a portion of our improved chain running over a driver; Fig. 3 a horizontal section, and Fig. 4 an inner face elevation of one of the links.

In the drawings, 10 indicates a bit-carrying block adapted to receive an ordinary coal cutting bit in the usual manner. This block 10 has a total length exactly equal to the somewhat similar blocks now commonly in use in those chains for which the present chain is a substitute. The blocks 10 of our improved chain however differ materially from the common blocks. Our improved block 10 at one end is provided with a transverse opening 11 of ordinary size the center of said opening being upon the pitch circle 12 of the sprocket 13 when the block is in place upon the sprocket. At the opposite end block 10 is provided with a transverse opening 14 which is considerably larger in diameter than opening 11 and has its center brought as closely as possible to the pitch circle 12. This is accomplished by shifting the center of opening 14 toward the center of opening 11 by an amount sufficient to compensate for the difference in radii. Associated with each block 10 are two pairs of links which are identical. These links 15 and 16 are formed as rights and lefts and each is provided at its rear end with a small hollow pin or stud 17 which has a diameter fitting opening 11. At the opposite end each of the links 15 and 16 is provided with a larger hollow pin or stud 18 having a diameter equal to the diameter of opening 14. After a pair of links are associated with two adjacent blocks in the manner illustrated they will be held in place either by bolts or rivets 19 passed through the bores of the pins 17 and 18. As compared with a standard chain the links 15—16 will have a length, between centers of pins, slightly longer than has heretofore been customary, this increase of length being due to the decrease in distance between the centers of the openings 11 and 14 so that a chain is produced in which the distances between alternate centers are different instead of uniform, as has heretofore been the custom. By this arrangement it will be seen that the forward pins of each pair of links, and the corresponding opening in the rear of each bit-carrying block, are larger than the rear pins of each pair of links and consequently offer, at this point of greater wear, increased frictional surface so that the load is distributed, thereby producing a chain which will wear considerably longer than the standard chains now commonly in use. On the other hand it is to be noticed that, by retaining pins 11 of the same size as the pins of the standard chain, the number of bit blocks in a chain is not increased or diminished and the ultimate strength of the chain is not at all increased because there will be one small pin 11 to each bit block. This will be the pin which will shear in the case of application of too great resistance, the pin shearing before there can be any damage to the driving gearing of the machine. This is important because, otherwise, the chain could not be substituted for a worn out chain in a standard mining machine, of which many are now in constant use.

We claim as our invention:—

1. For combination with a standard cutter-chain-carrying sprocket wheel of mining machines, a bit-carrying chain comprising a plurality of bit blocks each of a length to fit between the teeth of said sprocket wheel, and a plurality of interspersed links connecting such bit blocks in spaced relation to permit such co-action with the sprocket wheel; a pivotal connection between each link and the adjacent block, the pivotal connection between the rear end of each block and the forward end of the associated link being of greater diameter and having its center farther from the adjacent end of the block than the pivotal connection between the forward end of the block and the rear end of the other associated link, the distance between the pivotal centers of each block being thus less than the distance between the pivotal centers of each link, for the purpose set forth.

2. For combination with a standard cutter-chain-carrying sprocket wheel of mining machines, a bit-carrying chain comprising a plurality of bit blocks each of a length to fit between the teeth of said sprocket wheel and each having a pair of transverse openings formed therethrough with the rear opening of larger diameter than the forward opening, a plurality of links connecting the several bit blocks for association with such sprocket wheel, each of said links comprising a pair of mating members each having formed integral therewith a large lug at its forward end and a small lug at its rear end, the large lug fitting the large opening in the rear end of the bit block and the small lug fitting the small opening in the forward end of the adjacent bit block, the distance between the centers of the block openings being less than the distance between centers of the link lugs, and means for retaining the link members in association with the bit blocks.

In witness whereof, we have hereunto set our hands and seals at Terre Haute, Indiana, this 26th day of January, A. D. one thousand nine hundred and ten.

WILLIAM A. BUETTNER. [L. S.]
ARTHUR SHELBURNE. [L. S.]

Witnesses:
  E. JEWELL,
  ALONZO C. OWENS.